(12) United States Patent
Abe et al.

(10) Patent No.: US 12,422,788 B2
(45) Date of Patent: Sep. 23, 2025

(54) MODEL UPDATE DEVICE, METHOD, AND PROGRAM

(71) Applicant: OMRON Corporation, Kyoto (JP)

(72) Inventors: Yasuaki Abe, Kyoto (JP); Yuki Ueyama, Kyoto (JP); Shuji Inamoto, Kyoto (JP); Yoshiki Ito, Kyoto (JP)

(73) Assignee: OMRON Corporation, Kyoto (JP)

( * ) Notice: Subject to any disclaimer, the term of this patent is extended or adjusted under 35 U.S.C. 154(b) by 524 days.

(21) Appl. No.: 17/798,395

(22) PCT Filed: Jan. 25, 2021

(86) PCT No.: PCT/JP2021/002486
§ 371 (c)(1),
(2) Date: Aug. 9, 2022

(87) PCT Pub. No.: WO2021/171863
PCT Pub. Date: Sep. 2, 2021

(65) Prior Publication Data
US 2023/0075229 A1    Mar. 9, 2023

(30) Foreign Application Priority Data
Feb. 27, 2020 (JP) ................................. 2020-032223

(51) Int. Cl.
*G05B 13/02*    (2006.01)
(52) U.S. Cl.
CPC ....... *G05B 13/021* (2013.01); *G05B 13/0265* (2013.01); *G05B 13/026* (2013.01)
(58) Field of Classification Search
CPC .............. G05B 13/021; G05B 13/0265; G05B 13/026; G05B 2219/33027;
(Continued)

(56) References Cited

U.S. PATENT DOCUMENTS

| 2007/0005311 A1* | 1/2007 | Wegerich ........... G05B 23/0254 |
| | | 703/2 |
| 2007/0078533 A1* | 4/2007 | Caldwell ............. G05B 13/048 |
| | | 700/44 |

(Continued)

FOREIGN PATENT DOCUMENTS

| JP | H02-098771 A | 4/1990 |
| JP | H04-299444 A | 10/1992 |

(Continued)

OTHER PUBLICATIONS

International Search Report issued in corresponding International Patent Application No. PCT/JP2021/002486 dated Apr. 20, 2021.

(Continued)

*Primary Examiner* — Christopher E. Everett
(74) *Attorney, Agent, or Firm* — Morgan, Lewis & Bockius LLP

(57) ABSTRACT

An acquisition unit (11) acquires an explanatory variable that is to be input to a model (37) configured to output an objective variable for the explanatory variable, a specification unit (12) associates a frequency at which an explanatory variable included in each of a plurality of areas, which are obtained by dividing an explanatory variable space, is acquired by the acquisition unit (11) with each of the plurality of areas, and specifies an area to which an explanatory variable included in learning data used to learn the model (37) belongs and in which a frequency of an explanatory variable acquired by the acquisition unit (11) is a predetermined value or less, and an update unit (14) updates the model (37) in such a manner that learning data including an explanatory variable belonging to an area specified by the specification unit (12) is forgotten.

9 Claims, 11 Drawing Sheets

(58) Field of Classification Search
CPC ........ G05B 2219/33038; G05B 19/056; G05B 19/4065; G06N 5/01; G06N 20/00
See application file for complete search history.

(56) References Cited

U.S. PATENT DOCUMENTS

| | | | |
|---|---|---|---|
| 2009/0105855 A1* | 4/2009 | Mehta | G05B 13/048 700/89 |
| 2018/0082215 A1 | 3/2018 | Mizobuchi | |
| 2018/0181867 A1 | 6/2018 | Seibold et al. | |
| 2022/0011000 A1* | 1/2022 | Shimamura | F24F 11/30 |

FOREIGN PATENT DOCUMENTS

| | | |
|---|---|---|
| JP | 2018-045559 A | 3/2018 |
| JP | 2018-129033 A | 8/2018 |
| JP | 2019-028565 A | 2/2019 |
| JP | 2019-028824 A | 2/2019 |

OTHER PUBLICATIONS

Written Opinion issued in corresponding International Patent Application No. PCT/JP2021/002486 dated Apr. 20, 2021.
Liu et al., "Regional Concept Drift Detection and Density Synchronized Drift Adaptation," Proceedings of the Twenty-Sixth International Joint Conference on Artificial Intelligence, pp. 2280-2286 (2017) XP093132015, California, US, DOI: 10.24963/ijcai.2017/317, ISBN: 978-0-9992411-0-3.
Dasu et al., "An Information-Theoretic Approach to Detecting Changes in Multi-Dimensional Data Streams," (2014) XP093131937, Retrieved from the Internet: URL: https://www.researchgate.net/profile/Shankar-Krishnan-3/publication/248542520_An_Information-Theoretic_Approach_to_Detecting_Changes_in_MultiDimensional_Data_Streams/links/0c96052960ec2c6a07000000/An-Information-Theoretic-Approach-to-Detecting-Changes-in-MultiDimensional-Data-Streams.pdf.
Bifet et al., "Adaptive Parameter-free Learning from Evolving Data Streams," (2016) XP093132204, Retrieved from the Internet: URL: https://upcommons.upc.edu/bitstream/handle/2117/87914/R09-9.pdf?sequence=1&isAllowed=y.
Extended European Search Report dated Feb. 27, 2024, issued in corresponding European Patent Application No. 21759642.8.

* cited by examiner

FIG.5
<START OF OPERATION>
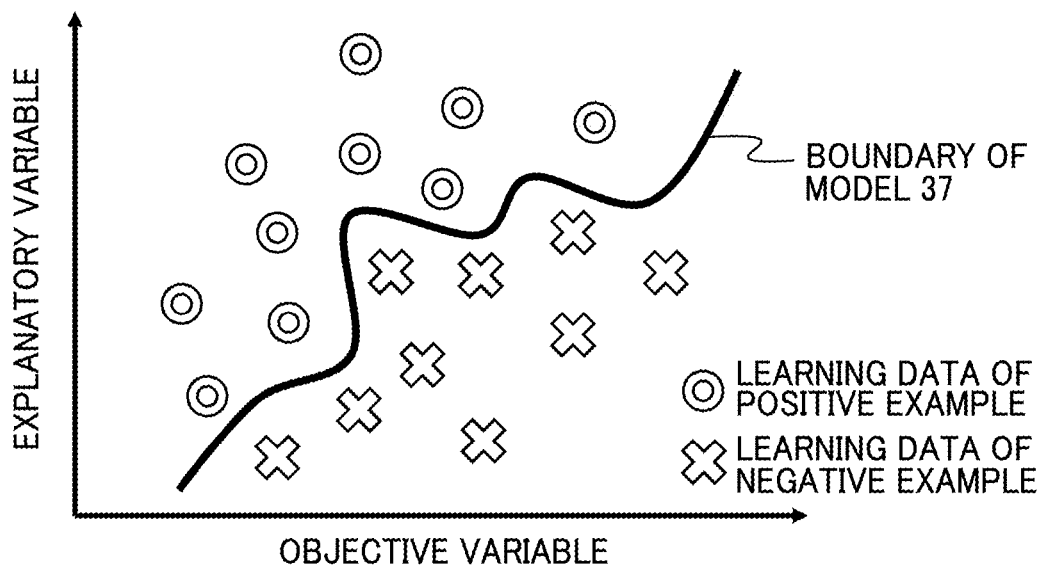
<DURING OPERATION>
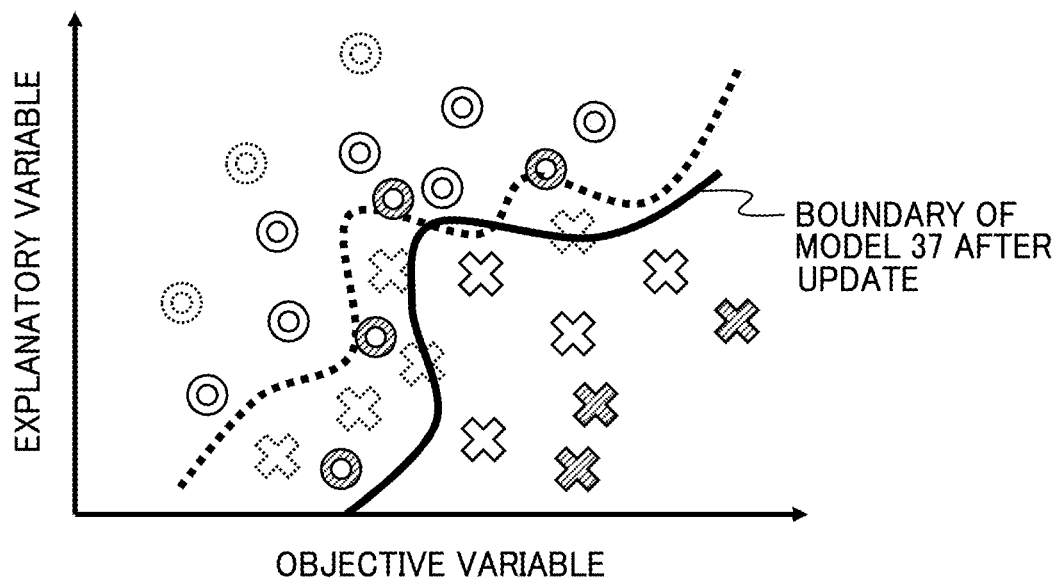

MODEL UPDATE DEVICE, METHOD, AND PROGRAM

TECHNICAL FIELD

The present disclosure relates to a model update device, a model update method, and a model update program.

BACKGROUND ART

By performing additional learning or relearning on a model learned in advance so as to infer and output an objective variable for an input explanatory variable, the inference accuracy of the model has been maintained or improved.

For example, there has been proposed a technique for improving the failure prediction accuracy of mechanical equipment. In this technique, sensor data of a plurality of sensors provided in the mechanical equipment is collected, and the data of a predetermined period during which the mechanical equipment is in a normal state and the data of evaluation at the time of any evaluation are extracted from the sensor data. Furthermore, in this technique, by performing machine learning using the data of the normal period, the correlation model for the mechanical equipment is generated, and the sample data of the normal period is derived from an output value of the correlation model obtained by inputting the data of the normal period to the correlation model. According to this technique, the degree of deviation of the mechanical equipment from the normal state is evaluated using an output value of the correlation model obtained by inputting the data of evaluation to the correlation model, and the failure symptom of the mechanical equipment is determined on the basis of the degree of deviation. In this technique, the correlation model is updated by performing machine learning in such a manner that the sample data of additional learning including the sensor data corresponding to extracted erroneous detection and the sample data of the normal period are reflected (see Japanese Patent Application Laid-Open (JP-A) No. 2019-28565).

SUMMARY OF INVENTION

Technical Problem

However, in a case in which there is a change in the overall state of an inference target assumed by a model, the inference accuracy may not be improved only by additional learning of new learning data.

The present disclosure has been made in view of the above points, and an object thereof is to update a model so as to effectively improve the inference accuracy of the model.

Solution to Problem

In order to achieve the object, a model update device according to the present disclosure is configured to include an acquisition unit configured to acquire an explanatory variable that is to be input to a model configured to output an objective variable for the explanatory variable, a specification unit configured to associate a frequency at which an explanatory variable included in each of a plurality of areas, which are obtained by dividing an explanatory variable space, is acquired by the acquisition unit with each of the plurality areas, and configured to specify an area to which an explanatory variable included in learning data used to learn the model belongs and in which a frequency of an explanatory variable acquired by the acquisition unit is a predetermined value or less, and an update unit configured to update the model in such a manner that learning data including an explanatory variable belonging to an area specified by the specification unit is forgotten.

The update unit may update the model by removing a portion of the model that has been learned with learning data that is to be forgotten.

The update unit may update the model by relearning the model using learning data from which learning data that is to be forgotten has been removed.

The model update device may further include a determination unit configured to determine an inference accuracy of the model, wherein: the acquisition unit may acquire an objective variable for when the explanatory variable is input to the model and an expected value for the explanatory variable, the determination unit may determine whether or not the inference accuracy satisfies a predetermined accuracy based on the objective variable and the expected value acquired by the acquisition unit, and in a case in which the determination unit determines that the inference accuracy does not satisfy the predetermined accuracy, the update unit may update the model by additionally learning the model using learning data in which an expected value for an explanatory variable acquired by the acquisition unit is used as a new objective variable for the explanatory variable.

The update unit may update the model in such a manner that learning data including an explanatory variable for the new objective variable, the explanatory variable being associated with an objective variable other than the new objective variable, is forgotten.

The model update device may be configured to further include a control unit configured to generate and output a control signal for controlling a control target, the control unit generating the control signal from an objective variable that is output from the model.

A model update method according to the disclosure includes causing an acquisition unit to acquire an explanatory variable that is to be input to a model configured to output an objective variable for the explanatory variable, causing a specification unit to associate a frequency at which an explanatory variable included in each of a plurality of areas, which are obtained by dividing an explanatory variable space is acquired by the acquisition unit with each of a plurality of areas, and to specify an area to which an explanatory variable included in learning data used to learn the model belongs and in which a frequency of an explanatory variable acquired by the acquisition unit is a predetermined value or less, and causing an update unit to update the model in such a manner that learning data including an explanatory variable belonging to an area specified by the specification unit is forgotten.

A model update program according to the disclosure that causes a computer to function as an acquisition unit configured to acquire an explanatory variable that is to be input to a model configured to output an objective variable for the explanatory variable, a specification unit configured to associate a frequency at which an explanatory variable included in each of a plurality of areas, obtained by dividing an explanatory variable space, is acquired by the acquisition unit with each of a plurality of areas, and configured to specify an area to which an explanatory variable included in learning data used to learn the model belongs and in which a frequency of an explanatory variable acquired by the acquisition unit is a predetermined value or less, and an update unit that updates the model in such a manner that learning data including an explanatory variable belonging to an area specified by the specification unit is forgotten.

Advantageous Effects of Invention

According to the model update device, the method, and the program according to the present disclosure, it is possible to update the model so as to effectively improve the inference accuracy of the model.

BRIEF DESCRIPTION OF DRAWINGS

FIG. 5 is a diagram for explaining an outline of model update.

DESCRIPTION OF EMBODIMENTS

Figure 1:
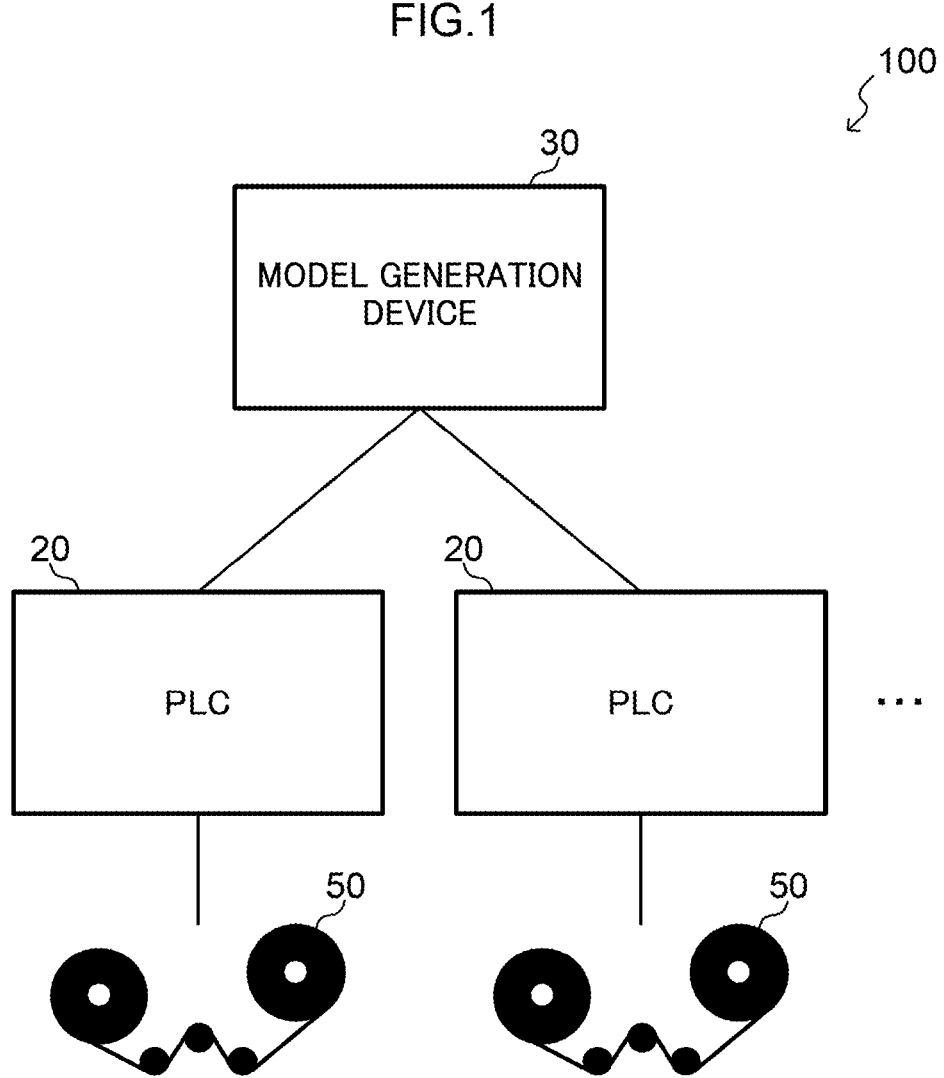
FIG. 1 is a block diagram illustrating a schematic configuration of a prediction control system according to the present embodiment.

Hereinafter, an example of an embodiment of the present disclosure will be described with reference to the drawings. The present embodiment will describe, as an example, a prediction control system including a programmable logic controller (PLC) having a model update device according to the disclosure mounted therein. In the individual drawings, the same or equivalent components and portions are denoted by the same reference numerals. Dimensions and ratios of the drawings are exaggerated for convenience of description, and may be different from actual ratios.

As illustrated in FIG. 1, a prediction control system 100 according to the embodiment includes a model generation device 30, a PLC 20, and a manufacturing apparatus 50. The PLC 20 controls an operation of the manufacturing apparatus 50 to be controlled using a model generated by the model generation device 30. The manufacturing apparatus 50 is, for example, a conveying device or a pressing machine. The number of the manufacturing apparatuses 50 to be controlled by the PLCs 20 may be one or plural. Each set of the PLC 20 and the manufacturing apparatus 50 may be installed at each of a plurality of different manufacturing sites.

Figure 2:
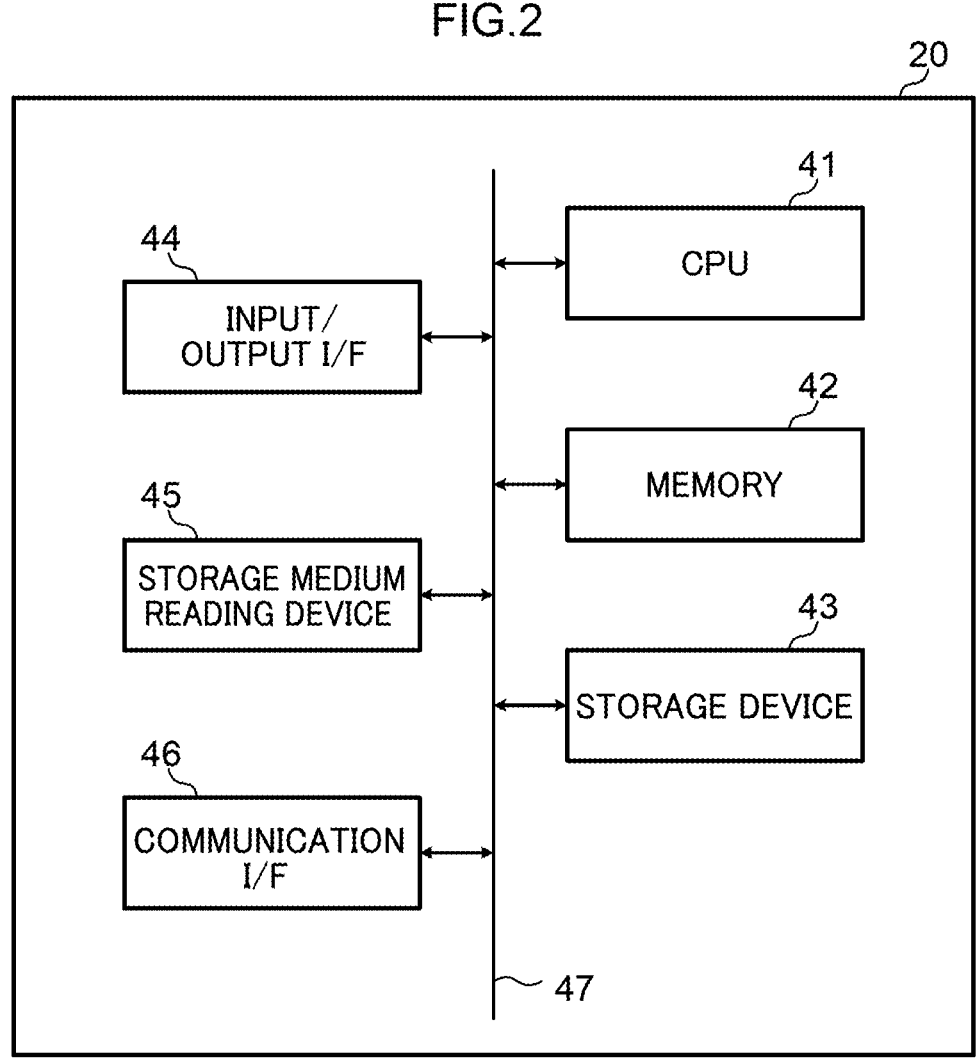
FIG. 2 is a block diagram illustrating a hardware configuration of a PLC according to the embodiment.

FIG. 2 is a block diagram illustrating a hardware configuration of the PLC 20 according to the embodiment. As illustrated in FIG. 2, the PLC 20 includes a central processing unit (CPU) 41, a memory 42, a storage device 43, an input/output interface (I/F) 44, a storage medium reading device 45, and a communication I/F 46. The individual components are communicably connected to each other via a bus 47.

The storage device 43 stores various programs including a control program for performing a control process to be described later and a model update program for performing a model update process. The CPU 41 is a central processing unit, and executes various programs and controls the individual components. That is, the CPU 41 reads a program from the storage device 43 and executes the program using the memory 42 as a work area. The CPU 41 controls of each of the components and performs various types of arithmetic processing in accordance with the programs stored in the storage device 43.

The memory 42 includes a random access memory (RAM), and temporarily stores a program and data as a work area. The storage device 43 includes a read only memory (ROM), a hard disk drive (HDD), a solid state drive (SSD), and the like, and stores various programs including an operating system and various data.

The input/output I/F 44 is an interface that inputs data from the manufacturing apparatus 50 and outputs data to the manufacturing apparatus 50. Furthermore, an input device for performing various inputs, such as a keyboard or a mouse, and an output device for outputting various types of information, such as a display or a printer, may be connected. By employing a touch panel display as the output device, the touch panel display may also function as the input device.

The storage medium reading device 45 reads data stored in various storage media such as a compact disc (CD)-ROM, a digital versatile disc (DVD)-ROM, a Blu-ray disc, and a universal serial bus (USB) memory, writes data to the storage media, and the like.

The communication I/F 46 is an interface for communicating with another device such as the model generation device 30, and standards such as Ethernet (registered trademark), FDDI, and Wi-Fi (registered trademark) are used.

Since the hardware configuration of the model generation device 30 is similar to the hardware configuration of the PLC 20, the description thereof will be omitted.

Figure 3:
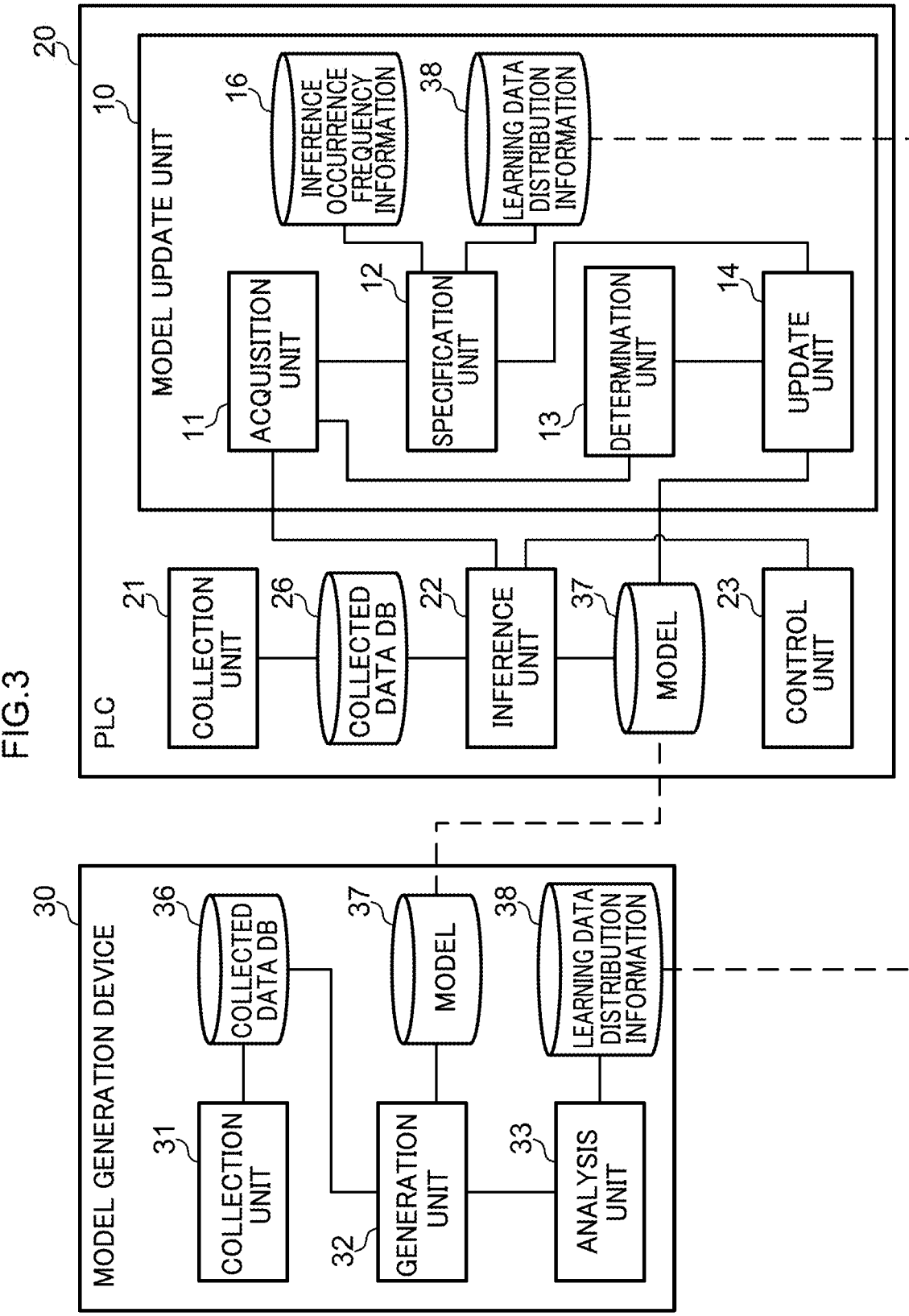
FIG. 3 is a block diagram illustrating functional configurations of a model generation device and the PLC.

FIG. 3 illustrates functional configurations of the model generation device 30 and the PLC 20.

As illustrated in FIG. 3, the model generation device 30 functionally includes a collection unit 31, a generation unit 32, and an analysis unit 33.

The collection unit 31 collects information (hereinafter, referred to as "observation information") based on data observed in the manufacturing apparatus 50 and stores the information in a collected data DB 36. The observation information is time-series information such as the rotation speed of a motor in the manufacturing apparatus 50, sensor values detected by various sensors provided in the manufacturing apparatus 50, and processing results obtained by performing a determination process or the like on the basis of these values.

The generation unit 32 generates a model 37 by learning in advance parameters of the model 37 used to control the manufacturing apparatus 50 by the PLC 20 using learning data, the model 37 outputting an objective variable for an explanatory variable.

In the embodiment, the explanatory variable is information based on the observation information collected by the collection unit 31, and the objective variable is a value indicating the state of the manufacturing apparatus 50 after a predetermined time from acquisition of the observation information indicated by the explanatory variable. That is, the model 37 infers the state of the manufacturing apparatus 50 after a predetermined time on the basis of the observation information.

Therefore, the generation unit 32 acquires the observation information stored in the collected data DB 36 and extracts the explanatory variable based on the observation information. In addition, the generation unit 32 extracts an objective variable indicating a correct state of the manufacturing apparatus 50 after a predetermined time in a case in which the observation information is observed. The generation unit 32 generates the model 37 by learning the parameters of the model 37 using a pair of the explanatory variable and the objective variable extracted as learning data. The generation unit 32 distributes the model 37 in which the parameters are learned to each of the PLCs 20.

Figure 4:
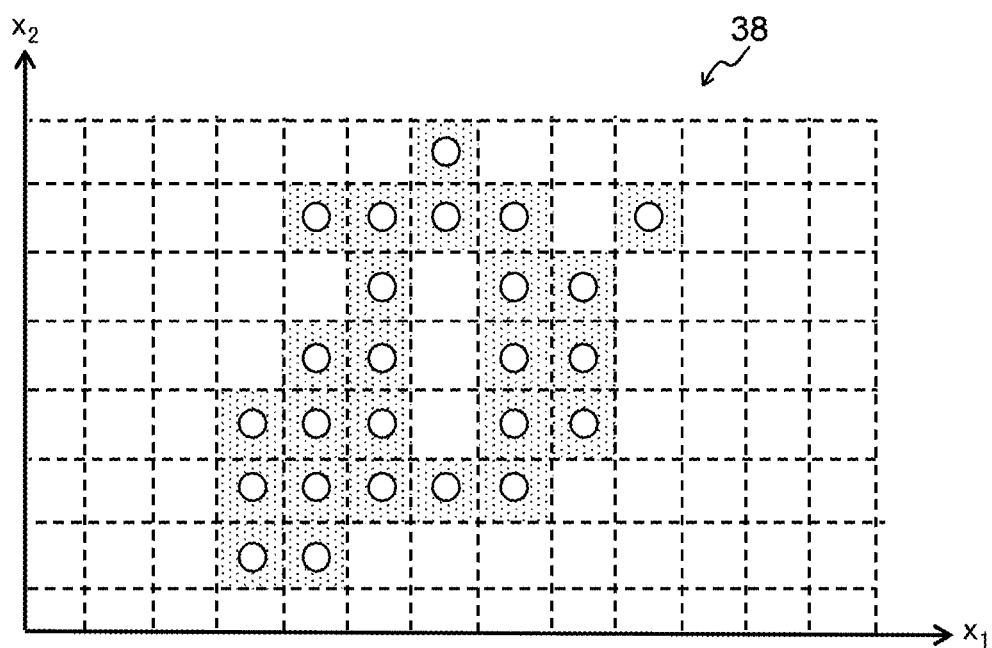
FIG. 4 is a diagram conceptually illustrating learning data distribution information.

The analysis unit 33 generates learning data distribution information 38 indicating a distribution of areas to which the explanatory variables included in the learning data used to learn the model 37 belong in an explanatory variable space. FIG. 4 conceptually illustrating the learning data distribution information 38. The example of FIG. 4 illustrates a case in which there are two explanatory variables $x_1$ and $x_2$. The analysis unit 33 divides the explanatory variable space having $x_1$ and $x_2$ axes into, for example, mesh-like areas as illustrated in FIG. 4. Then, for each piece of the learning data used to learn the model 37, a value indicating that the learning data is present is given to an area to which the explanatory variable (a white circle in FIG. 4) included in the learning data belongs. In the example of FIG. 4, the area where the learning data is present is represented as a shaded area, and the area where the learning data is not present is represented by a white area. The analysis unit 33 distributes the generated learning data distribution information 38 to each of the PLCs 20.

Next, the functional configuration of the PLC 20 according to the embodiment will be described.

As illustrated in FIG. 3, the PLC 20 includes, as a functional configuration, a collection unit 21, an inference unit 22, a control unit 23, and a model update unit 10. Note that the model update unit 10 is an example of the model update device of the disclosure. The model 37 and the learning data distribution information 38 distributed from the model generation device 30 are stored in a predetermined storage area of the PLC 20.

Similarly to the collection unit 31 of the model generation device 30, the collection unit 21 collects the observation information from the manufacturing apparatus 50 controlled by the PLC 20 and stores the observation information in a collected data DB 26.

The inference unit 22 acquires the observation information stored in the collected data DB 26, extracts an explanatory variable based on the observation information, inputs the explanatory variable to the model 37, and acquires an objective variable that is an inference result. The inference unit 22 delivers the acquired objective variable to the control unit 23. In addition, the inference unit 22 delivers the explanatory variable input to the model 37 and the objective variable acquired as the output of the model 37 to an acquisition unit 11 of the model update unit 10 to be described later.

The control unit 23 generates and outputs a control signal for controlling the manufacturing apparatus 50 on the basis of the objective variable delivered from the inference unit 22. For example, the control unit 23 generates a control signal for adjusting the angle of a roller or changing the rotation speed of a motor in accordance with the state of the manufacturing apparatus 50 predicted by the model 37.

Functionally, the model update unit 10 further includes the acquisition unit 11, a specification unit 12, a determination unit 13, and an update unit 14.

First, the outline of the model update unit 10 will be described. The model 37 at the start of operation, that is, the model 37 immediately after being generated by the model generation device 30 is conceptually illustrated in the upper part of FIG. 5. A boundary of the model 37 is set so as to separate learning data of a positive example (a solid circle in FIG. 5) and learning data of a negative example (a solid cross in FIG. 5) in the space represented by an objective variable and an explanatory variable.

When the operation of control of the manufacturing apparatus 50 using the model 37 starts, there is a case in which the observed observation information gradually changes, that is, the state of the manufacturing apparatus 50 changes because the state of the apparatus is degraded over time. In such a case, as illustrated in the lower part of FIG. 5, there is data that is less likely to be generated in actual operation around the learning data used to learn the model 37 (a circle and a cross in dotted lines in FIG. 5). In addition, there is a case in which data that is not present in the learning data used to learn the model 37 is likely to be generated at the time of actual operation (a hatched circle and a hatched cross in FIG. 5).

In general, in a case in which a problem occurs in the inference accuracy of a model after the start of operation, the initial learning data set used to learn the model is called once. The model is then updated by performing learning using a learning data set obtained by adding newly obtained learning data for additional learning to the initial learning data set. That is, data newly obtained from the manufacturing apparatus 50 is added to the model 37 having mounted in the PLC 20 for update. However, in this case, as described above, in a case in which the state of the manufacturing apparatus 50 changes due to aging degradation or the like, the behavior modeled by the original learning data continues to remain in the model 37 only by performing additional learning using the latest data. Therefore, a problem of the inference accuracy may remain.

The model update unit 10 updates the model 37 in such a manner that learning data in which inference is less likely to occur in the periphery is forgotten. For data in which new inference has occurred, additional learning is performed with new learning data to update the model 37. As a result, as illustrated in the lower part of FIG. 5, the boundary of the model 37 is updated from a state indicated by a dotted line to a state indicated by a solid line. The state of the model 37 can also be shifted in accordance with the change in the state of the manufacturing apparatus 50.

Hereinafter, each of the functional units of the model update unit 10 will be described in detail.

The acquisition unit 11 acquires an explanatory variable input to the model 37 from the inference unit 22. The acquisition unit 11 delivers the acquired explanatory variable to the specification unit 12.

The acquisition unit 11 also acquires an objective variable delivered from the inference unit 22, that is, the objective variable output when the explanatory variable is input to the model 37, and delivers the objective variable to the determination unit 13 in association with the explanatory variable. In addition, the acquisition unit 11 extracts an expected value for the explanatory variable, that is, an objective variable that is a correct answer for the explanatory variable, from the observation information collected after a predetermined time, and delivers the objective variable to the determination unit 13 in association with the explanatory variable.

The specification unit 12 generates inference occurrence frequency information 16 in which the frequency at which an explanatory variable included in each area obtained by dividing the explanatory variable space is acquired by the acquisition unit 11 is associated with each area, similarly to the learning data distribution information 38. The frequency at which the explanatory variable is acquired by the acquisition unit 11 is a frequency at which inference based on the explanatory variable included in the corresponding area occurs.

Figure 6:
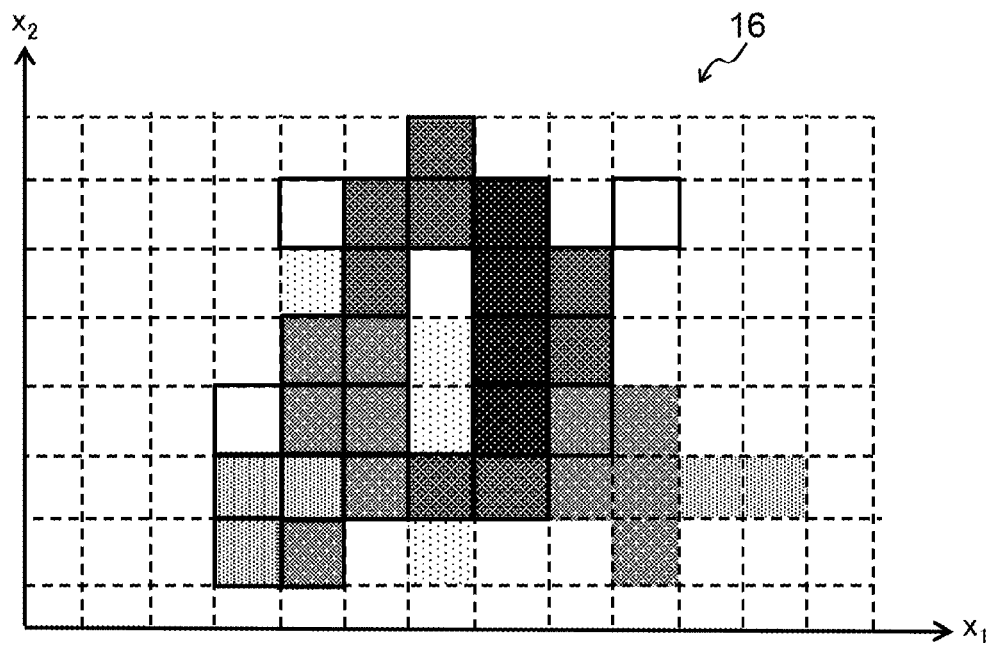
FIG. 6 is a diagram conceptually illustrating inference occurrence frequency information.

FIG. 6 is a diagram conceptually illustrating the inference occurrence frequency information 16. In an example of FIG. 6, the inference occurrence frequency information 16 is superimposed on the learning data distribution information 38. In FIG. 6, the area indicated by a thick frame is an area where learning data used to learn the model 37 is present, which is indicated by the learning data distribution information 38. In addition, in the example of FIG. 6, the frequency at which the inference based on the explanatory variable belonging to each area has occurred is represented by the density of the area, and the higher the density, the higher the frequency.

Specifically, every time the explanatory variable is delivered from the acquisition unit 11, the specification unit 12 adds one to the frequency held in the area to which the acquired explanatory variable belongs in the inference occurrence frequency information 16. The specification unit 12 may normalize the frequency of each area in such a manner that the maximum value of the frequency in the inference occurrence frequency information 16 is a predetermined value.

The specification unit 12 specifies an area to which the explanatory variable included in the learning data used to learn the model 37 belongs and in which the frequency of occurrence of inference is a predetermined value or less. The predetermined value can be a value set in advance. Alternatively, the predetermined value may be a predetermined frequency from the bottom of the order of frequency. In this case, it is possible to specify an area having a frequency relatively lower than that of other areas. The specification unit 12 delivers information of the specified area to the update unit 14. The learning data including the explanatory variable belonging to the specified area corresponds to the learning data in which inference is less likely to occur in the periphery, which is described in FIG. 5, and is learning data to be forgotten.

Figure 7:
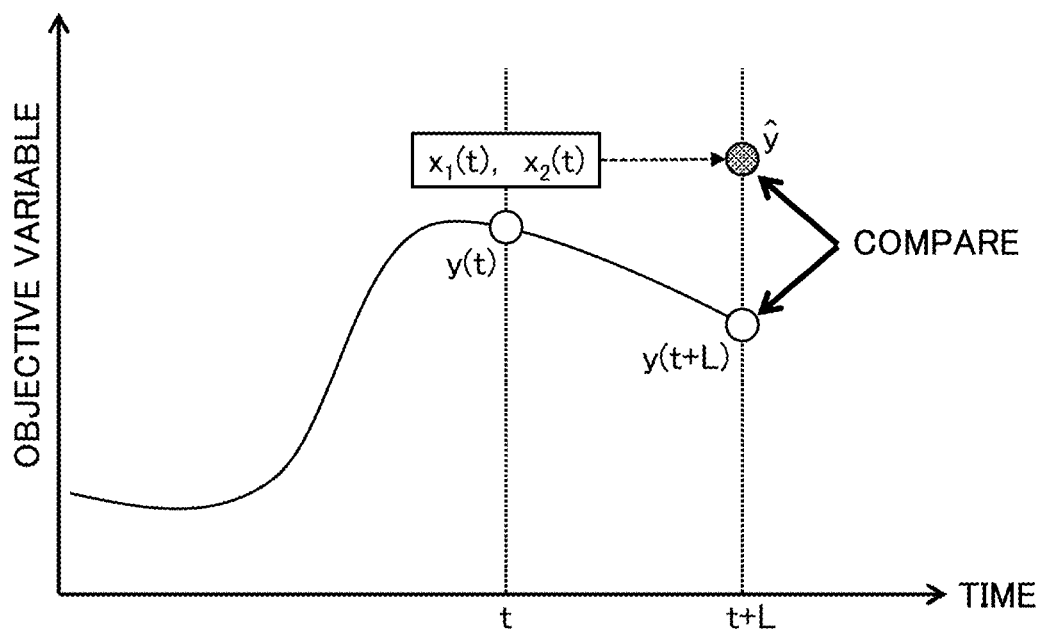
FIG. 7 is a diagram for explaining determination of inference accuracy.

The determination unit 13 determines the inference accuracy of the model 37. Specifically, the determination unit 13 compares the objective variable corresponding to the explanatory variable delivered from the acquisition unit 11 with the expected value, and determines whether or not the inference accuracy of the model 37 satisfies a predetermined accuracy. For example, as illustrated in FIG. 7, it is assumed that the model 37 infers a state after a predetermined time L. In this case, the determination unit 13 acquires an objective variable $\hat{y}$ (in FIG. 7, "^" is placed on "y"), which is an output from the model 37, for an explanatory variable $(x_1(t), x_2(t))$ acquired at a time t, and an expected value $y(t+L)$ extracted from observation information acquired at a time $t+L$. The determination unit 13 then determines the inference accuracy on the basis of an error between $\hat{y}$ and $y(t+L)$ and whether or not $y(t+L)$ is included in a predetermined confidence interval of $\hat{y}$.

For example, in a case in which the error between the objective variable and the expected value is a predetermined value or less, the determination unit 13 determines that the inference accuracy satisfies the predetermined accuracy. On the other hand, in a case in which the error between the objective variable and the expected value exceeds the predetermined value, it indicates that the state of the manufacturing apparatus 50 has changed from the time when the initial model 37 was learned, and the determination unit 13 determines that the inference accuracy does not satisfy the predetermined accuracy. The determination unit 13 delivers a determination result to the update unit 14.

When the information of the specified area is delivered from the specification unit 12, the update unit 14 updates the model 37 in such a manner that the learning data including the explanatory variable belonging to the specified area among the learning data used to learn the model 37 is forgotten.

Figure 8:
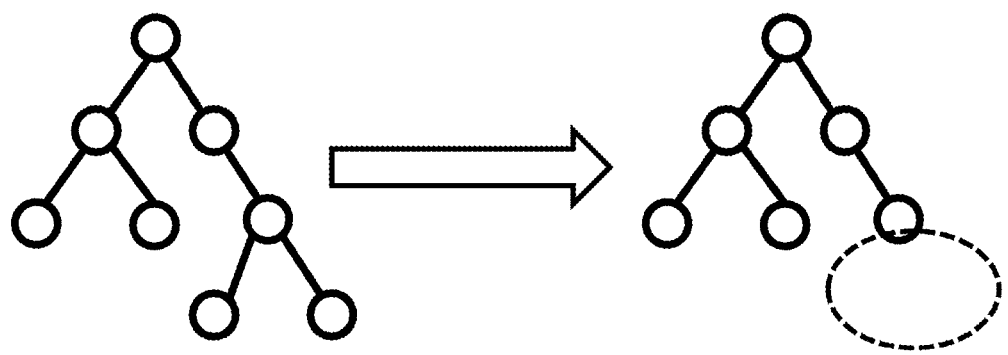
FIG. 8 is a diagram conceptually illustrating a state of model update by forgetting of learning data.

Specifically, the update unit 14 updates the model 37 by removing a portion of the model 37 learned with learning data to be forgotten. This process does not require the learning data set at the time of learning of the initial model 37, and an algorithm that enables direct addition and deletion of data to and from the model can be used. FIG. 8 conceptually illustrates a state in which the model 37 is updated at the time of forgetting of learning data using this algorithm. As illustrated in FIG. 8, in a case in which the model 37 is represented by a tree structure including a plurality of nodes, a node corresponding to a portion learned with learning data to be forgotten is removed by model update (an elliptical portion indicated by a broken line in FIG. 8). In the case of this process, estimation results by node portions other than the removed node do not change in the model 37.

The update unit 14 may update the model 37 by relearning the model 37 using learning data obtained by removing the learning data to be forgotten from the initial learning data set. In this case, the model update unit 10 may acquire the initial learning data set from the model generation device 30 and hold the initial learning data set.

Figure 9:
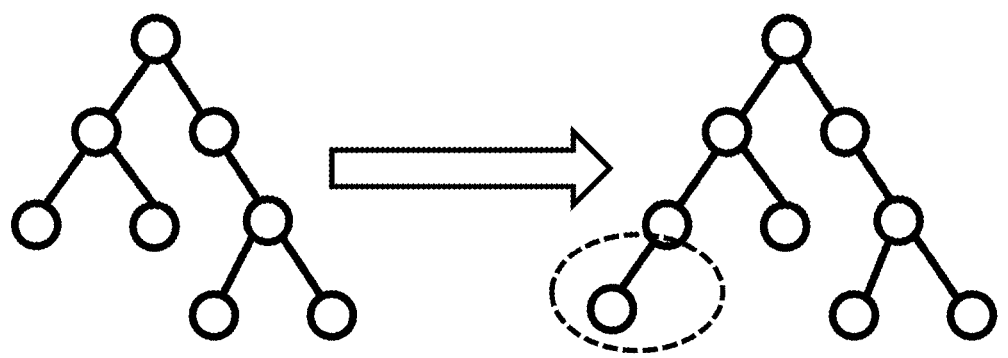
FIG. 9 is a diagram conceptually illustrating a state of model update by additional learning.

In a case in which the determination unit 13 determines that the inference accuracy does not satisfy the predetermined accuracy, the update unit 14 updates the model 37 by performing additional learning of the model 37. Specifically, the update unit 14 creates new learning data in which the expected value corresponding to the explanatory variable delivered from the acquisition unit 11 is used as a correct objective variable for the explanatory variable. Additional learning is then performed using the algorithm that enables direct addition and deletion of data to and from the model. FIG. 9 conceptually illustrates a state in which the model 37 is updated by additional learning using this algorithm. As illustrated in FIG. 9, a new node is added by model update (an elliptical portion indicated by a broken line in FIG. 9). In the case of this process, the inference result by the existing portion of the model 37 does not change.

The update unit 14 may update the model 37 by removing the learning data to be forgotten from the initial learning data set and performing relearning using a new learning data set to which new learning data is added.

Figure 10:
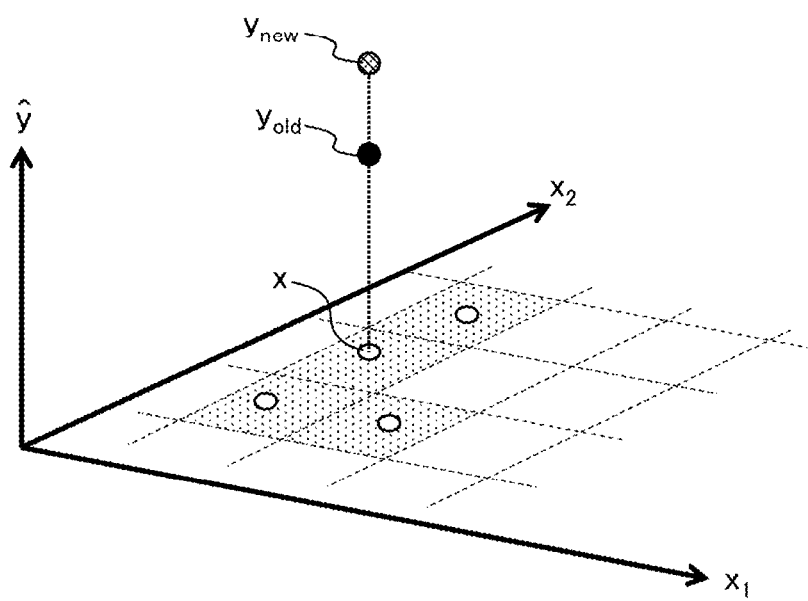
FIG. 10 is a diagram for explaining forgetting of original learning data when the learning data is added.

Alternatively, the update unit 14 updates the model 37 in such a manner that the learning data including the explanatory variable for the new objective variable, which is associated with an objective variable other than the new objective variable, is forgotten. For example, as illustrated in FIG. 10, in a case in which there is a pair of an explanatory variable x and an objective variable $y_{old}$ as the initial learning data, it is assumed that a pair of the explanatory variable x and an objective variable $y_{new}$ is added as new learning data. In this case, the update unit 14 updates the model 37 in such a manner the learning data that is the pair of the explanatory variable x and the objective variable $y_{old}$ is forgotten.

Next, an operation of the prediction control system 100 according to the embodiment will be described.

First, in the model generation device 30, the model 37 and the learning data distribution information 38 are generated and distributed to each of the PLCs 20.

Figure 11:
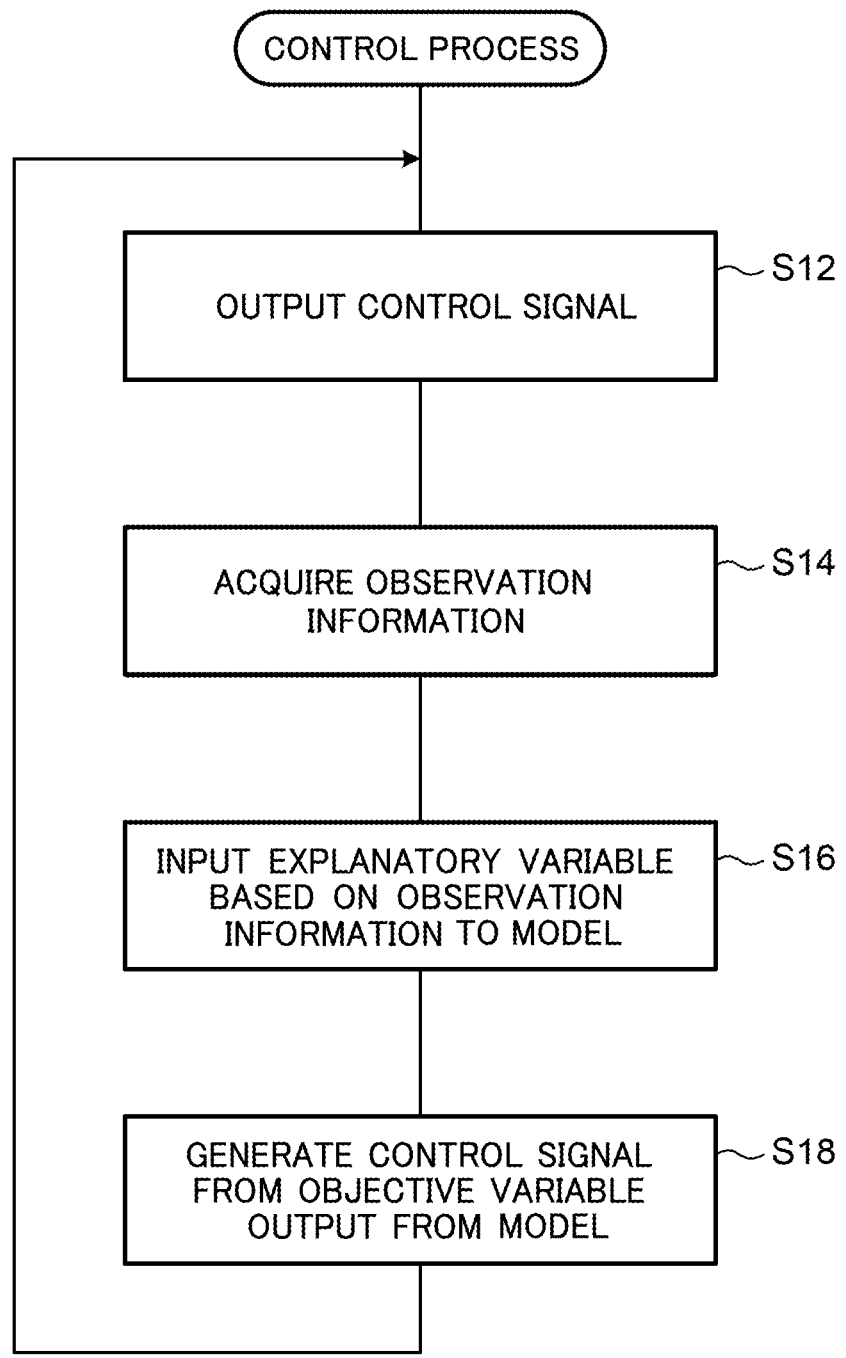
FIG. 11 is a flowchart illustrating a flow of a control process in the embodiment.

The PLC 20 starts operation using the model 37. Specifically, the PLC 20 performs a control process that is a process of controlling the manufacturing apparatus 50 using outputs of the model 37. FIG. 11 is a flowchart illustrating a flow of a control process performed by the CPU 41 of the PLC 20. By the CPU 41 reading a control program from the storage device 43, developing the control program in the memory 42, and executing the control program, the CPU 41 functions as each functional configuration of the PLC 20, and the control process illustrated in FIG. 11 is repeatedly performed.

In step S12, the control unit 23 outputs a control signal for controlling the manufacturing apparatus 50. The manufacturing apparatus 50 is thus controlled and operated on the basis of the control signal. With the operation of the manufacturing apparatus 50, observation information is observed in the manufacturing apparatus 50 and output to the PLC 20.

Next, in step S14, the collection unit 21 acquires the observation information from the manufacturing apparatus 50 and stores the observation information in the collected data DB 26.

Next, in step S16, the inference unit 22 acquires the observation information from the collected data DB 26, performs necessary processing on the observation information to process the observation information into an explanatory variable, and inputs the explanatory variable to the model 37. In a case in which the observation information is an explanatory variable to be directly input to the model 37, the inference unit 22 directly inputs the observation information to the model 37 as an explanatory variable.

Next, in step S18, the control unit 23 generates a control signal for controlling the manufacturing apparatus 50 on the basis of an objective variable output from the model. The process then returns to step S12.

Figure 12:
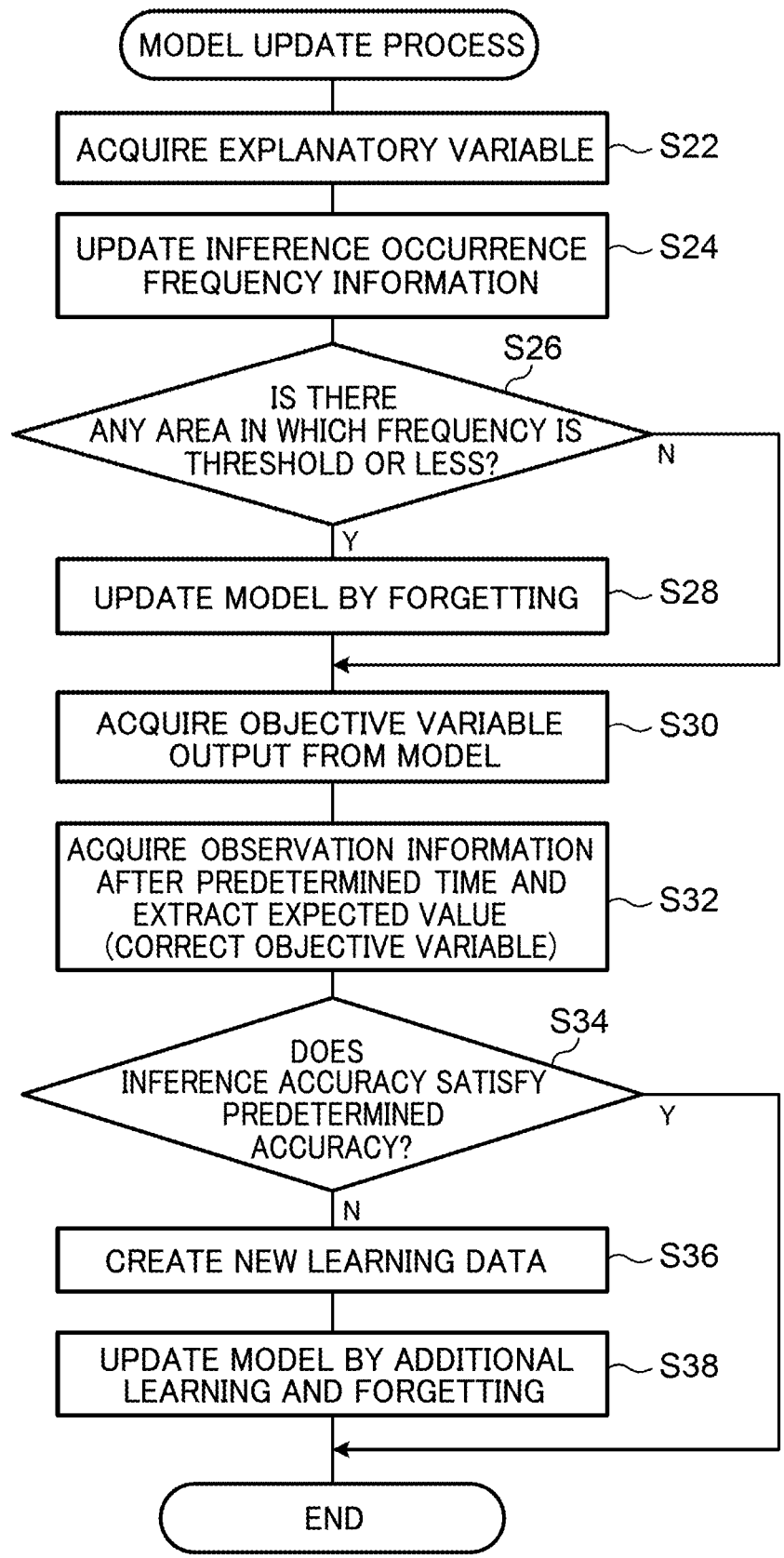
FIG. 12 is a flowchart illustrating a flow of a model update process in the embodiment.

Next, a model update process of updating the model 37 will be described. FIG. 12 is a flowchart illustrating a flow of a model update process performed by the CPU 41 of the PLC 20. By the CPU 41 reading a model update program from the storage device 43, developing the model update program in the memory 42, and executing the model update program, the CPU 41 functions as each functional configuration of the PLC 20, and the model update process illustrated in FIG. 12 is performed. The model update process is performed each time the observation information is collected from the manufacturing apparatus 50.

In step S22, the acquisition unit 11 acquires an explanatory variable input to the model 37 from the inference unit 22. The acquisition unit 11 delivers the acquired explanatory variable to the specification unit 12.

Next, in step S24, the specification unit 12 updates the inference occurrence frequency information 16 by, for example, adding one to the frequency held in the area to which the explanatory variable delivered from the acquisition unit 11 belongs in the inference occurrence frequency information 16.

Next, in step S26, the specification unit 12 compares the learning data distribution information 38 with the inference occurrence frequency information 16, and determines whether or not there is an area to which the explanatory variable included in the learning data used to learn the model 37 belongs and in which the frequency at which inference occurs is a predetermined value or less. If the area is present, the specification unit 12 delivers the information of the area to the update unit 14, and the process proceeds to step S28. If the area is not present, the process proceeds to step S30.

In step S28, the update unit 14 updates the model 37 in such a manner that the learning data including the explanatory variable belonging to the area specified by the specification unit 12 among the learning data used to learn the model 37 is forgotten.

Next, in step S30, the acquisition unit 11 acquires an objective variable delivered from the inference unit 22, that is, the objective variable output when the explanatory variable is input to the model 37, and delivers the objective variable to the determination unit 13 in association with the explanatory variable.

Next, in step S32, the acquisition unit 11 extracts an expected value for the explanatory variable, that is, an objective variable that is a correct answer for the explanatory variable, from the observation information collected after a predetermined time, and delivers the objective variable to the determination unit 13 in association with the explanatory variable.

Next, in step S34, the determination unit 13 compares the objective variable corresponding to the explanatory variable delivered from the acquisition unit 11 with the expected value, and determines whether or not the inference accuracy of the model 37 satisfies a predetermined accuracy. If the predetermined accuracy is not satisfied, the process proceeds to step S36, and if the predetermined accuracy is satisfied, the model update process ends.

In step S36, the update unit 14 creates new learning data in which the expected value corresponding to the explanatory variable delivered from the acquisition unit 11 is used as a correct objective variable for the explanatory variable.

Next, in step S38, the update unit 14 updates the model 37 by performing additional learning using the created new learning data. Furthermore, the update unit 14 updates the model 37 in such a manner that the learning data including the explanatory variable for the new objective variable, which is associated with an objective variable other than the new objective variable, is forgotten. The model update process then ends.

As described above, according to the prediction control system of the embodiment, the model update unit included in the PLC updates an explanatory variable input to a model that outputs an objective variable for the explanatory variable. The model update unit updates inference occurrence frequency information in which the frequency at which inference using an explanatory variable included in each area obtained by dividing an explanatory variable space occurs is associated with each area. The model update unit compares learning data distribution information indicating the area to which an explanatory variable included in learning data used to learn the model belongs with the inference occurrence frequency information. The model update unit specifies the area to which the explanatory variable included in the learning data used to learn the model belongs and in which the frequency of occurrence of inference is a predetermined value or less. The model update unit updates the model in such a manner that the learning data including the explanatory variable belonging to the area specified by the specification unit is forgotten.

As a result, it is possible to update the model so as to improve the inference accuracy of the model by preventing the behavior modeled by the original learning data from continuing to remain in the model. As a result, the model can be updated in accordance with the latest state of the manufacturing apparatus 50 on the PLC side, that is, on the site.

It is possible to further improve the inference accuracy by performing additional learning and update by forgetting the learning data after determining the inference accuracy of the model.

In a case in which the algorithm that enables direct addition and deletion of data to and from the model is used to update the model, it is not necessary to hold an initial learning set on the PLC side.

The embodiment has described the example in which the model update device of the disclosure is mounted on the PLC, and the disclosure is not limited thereto. The disclosure can be applied not only to a case in which outputs of the model are used to control a control target but also to various models.

The embodiment has described the case in which the explanatory variable space is divided into a mesh as the inference occurrence frequency information, and the disclosure is not limited thereto. For example, the area may be divided on the basis of the distance from the position of each learning data in the explanatory variable space.

The model update process performed by a CPU reading software (a program) in the embodiment may be performed by various processors other than the CPU. Examples of the processor in this case include a programmable logic device (PLD) in which a circuit configuration can be changed after manufacturing such as a field-programmable gate array (FPGA), and a dedicated electric circuit that is a processor having a circuit configuration exclusively designed to perform specific processing such as an application specific integrated circuit (ASIC). The model update process may be performed by one of these various processors, or may be performed by a combination of two or more processors of the same type or different types (for example, a plurality of FPGAs and a combination of a CPU and an FPGA). More specifically, the hardware structure of these various processors is an electric circuit obtained by combining circuit elements such as semiconductor elements.

The embodiment has described a mode in which the model update program is stored (installed) in a storage device in advance, and the disclosure is not limited to this. The program may be provided in a form stored in a storage medium such as a CD-ROM, a DVD-ROM, a Blu-ray disk, or a USB memory. Alternatively, the program may be downloaded from an external device via a network.

All documents, patent applications, and technical standards described in this specification are incorporated herein by reference to the same extent as if each document, patent application, and technical standard were specifically and individually indicated to be incorporated by reference.

REFERENCE SIGNS LIST 10 model update unit
11 acquisition unit
12 specification unit
13 determination unit
14 update unit
16 inference occurrence frequency information
20 PLC
21 collection unit
22 inference unit
23 control unit
26 collected data DB
30 model generation device
31 collection unit
32 generation unit
33 analysis unit
36 collected data DB
37 model
38 learning data distribution information
41 CPU
42 memory
43 storage device
44 input/output I/F
45 storage medium reading device
46 communication I/F
47 bus
50 manufacturing apparatus
100 prediction control system

The invention claimed is:

1. A model update device, comprising:
a memory, and
a processor coupled to the memory, the processor being configured to execute processing, the processing including:
acquiring an explanatory variable that is to be input to a model represented by a tree structure including a plurality of nodes, the model being configured to output an objective variable of a control target for the explanatory variable;
associating a frequency at which an explanatory variable included in each of a plurality of areas, which are obtained by dividing an explanatory variable space, is acquired with each of the plurality of areas, and specifying an area to which an explanatory variable included in learning data used to learn the model belongs and in which a frequency of an explanatory variable is a predetermined value or less;
updating the model by removing nodes in the model that have been trained with learning data including the explanatory variable belonging to the specified area; and
generating a control signal from an objective variable that is output from the model and controlling the control target by use of the control signal.

2. The model update device according to claim 1, wherein the processor is further configured to update the model by relearning the model using learning data from which learning data that is to be forgotten has been removed.

3. The model update device according to claim 1, the processor is further configured to
determine an inference accuracy of the model, wherein:
for the determining of the inference accuracy of the model, the processor is further configured to:
acquire an objective variable for the control target when the explanatory variable is input to the model, and an expected value for the explanatory variable,
determine whether or not the inference accuracy satisfies a predetermined accuracy based on the objective variable and the expected value, and
upon determining that the inference accuracy does not satisfy the predetermined accuracy, the processor is further configured to update the model by additionally learning the model using learning data in which an expected value for an explanatory variable acquired by the acquisition unit is used as a new objective variable of the control target for the explanatory variable.

4. The model update device according to claim 3, wherein the processor is further configured to update the model in such a manner that learning data including an explanatory variable for the new objective variable, the explanatory variable being associated with an objective variable of the control target other than the new objective variable, is forgotten.

5. A model update method, comprising:

acquiring, by a processor, an explanatory variable that is to be input to a model represented by a tree structure including a plurality of nodes, the model being configured to output an objective variable of a control target for the explanatory variable;

associating, by the processor, a frequency at which an explanatory variable included in each of a plurality of areas, which are obtained by dividing an explanatory variable space, is acquired with each of the plurality of areas, and specifying an area to which an explanatory variable included in learning data used to learn the model belongs and in which a frequency of an explanatory variable is a predetermined value or less;

updating, by the processor, the model by removing nodes in the model that have been trained with learning data including an explanatory variable belonging to the specified area; and generating a control signal from an objective variable that is output from the model and controlling the control target by use of the control signal.

6. The model update method according to claim 5, further comprising:

updating the model by relearning the model using learning data from which learning data that is to be forgotten has been removed.

7. The model update method according to claim 5, further comprising:

determining an inference accuracy of the model, wherein the determining of the inference accuracy of the model, includes:

acquiring the objective variable for of the control target when the explanatory variable is input to the model, and an expected value for the explanatory variable, determining whether or not the inference accuracy satisfies a predetermined accuracy based on the objective variable and the expected value, and upon determining that the inference accuracy does not satisfy the predetermined accuracy, updating the model by additionally learning the model using learning data in which an expected value for an explanatory variable acquired by the acquisition unit is used as a new objective variable of the control target for the explanatory variable.

8. The model update method according to claim 7, further comprising:

updating the model so that learning data including an explanatory variable for the new objective variable, the explanatory variable being associated with an objective variable of the control target other than the new objective variable, is forgotten.

9. A non-transitory storage medium storing a model update program that causes a computer including a processor to cause the processor to:

acquire an explanatory variable that is to be input to a model represented by a tree structure including a plurality of nodes, the model being configured to output an objective variable of a control target for the explanatory variable;

associate a frequency at which an explanatory variable included in each of a plurality of areas, obtained by dividing an explanatory variable space, is acquired with each of a plurality of areas, and specifying an area to which an explanatory variable included in learning data used to learn the model belongs and in which a frequency of an explanatory variable is a predetermined value or less;

update the model by removing nodes in the model that have been trained with learning data including an explanatory variable belonging to the specified area; and generate a control signal from an objective variable that is output from the model and control the control target by use of the control signal.

* * * * *